United States Patent [19]

Sutton

[11] Patent Number: 4,991,963
[45] Date of Patent: Feb. 12, 1991

[54] WAVELENGTH-INDEPENDENT INTERFEROMETER FOR OPTICAL SIGNAL PROCESSING

[75] Inventor: Philip Sutton, Hampshire, England

[73] Assignee: The Secretary of State for Defence in Her Britannic Majesty's Government of the United Kingdom of Great Britain and Northern Ireland, London, England

[21] Appl. No.: 424,094

[22] Filed: Sep. 21, 1989

Related U.S. Application Data

[63] Continuation of PCT GB88/00250, Mar. 31, 1988, published as WO88/08121 on Oct. 20, 1988.

[30] Foreign Application Priority Data

Apr. 9, 1987 [GB] United Kingdom ............... 8708488
May 8, 1987 [GB] United Kingdom ............... 8710883

[51] Int. Cl.$^5$ .............................................. G01B 9/02
[52] U.S. Cl. .................................................. 356/353
[58] Field of Search ............................... 356/346, 353

[56] References Cited

PUBLICATIONS

Hariharan et al., "Achromatic Fringes Formed in a Triangular Path Interferometer" *JOSA*, vol. 49, pp. 732-733, Jul. 1959.

*Primary Examiner*—Davis L. Willis
*Assistant Examiner*—Matthew W. Koren
*Attorney, Agent, or Firm*—Nixon & Vanderhye

[57] ABSTRACT

A wavelength-independent-interferometer comprises means to receive light (10) from a field of view, means (BS1) to separate the light into two beams (11, 12), means (BS2) to combine the two beams, and dispersive means (30) interposed in the path (12) of one of the two beams to produce a wavelength-dependent shear. The dispersive means may be a transmission diffraction grating or a reflection grating. In the arrangement shown the optical elements are combined in a modified Mach-Zehnder interferometer. When the conventional Mach-Zehnder interferometer is illuminated with coherent light the separation of interference fringes produced in the interference plane is inversely proportional to the wavelength. By introducing a dispersive element in the invention the detector is sensitized to a pre-determined fringe separation. A moveable reticle is placed in front of a detector to sensitize the detector to the fringe pattern.

7 Claims, 4 Drawing Sheets

WAVELENGTH-INDEPENDENT INTERFEROMETER FOR OPTICAL SIGNAL PROCESSING

This application is a continuing application under 35 USC 363 of International Application No. PCT/BG 88/00250 filed Mar. 31, 1988 published as WO88/08121 on Oct. 20, 1988.

The invention relates to detection systems and in particular to systems including optical processing of received signals prior to signal detection.

The principal problem for most current Electro-optical sensors is to achieve a high probability of detection with a low false alarm rate. It has been shown that optical processing prior to signal detection can give information on size, spectral profile, coherence and classification of targets. UK Patent No. 1595587 discloses optical transform image modulation techniques for improving signal processing. Spatial coherence of an object in the field of view, for example, may be used to distinguish the object from background clutter. UK Patent Application No. 8321752 discloses a fast optical spectrometer arrangement enabling the use of spectral profiles to distinguish objects. Further use of pre-detection signal processing is given in UK Patent Application No. 8301403 whereby the temporal coherence of received light is measured. Temporal coherence processing of the received illumination from a scene prior to detection has been found to be particularly effective for target and background discrimination. It can also be used to give information on target size and spectral profile.

Known techniques of pre-detector signal processing are wavelength dependent and the inventor has perceived the desirability of a wavelength-independent optical processor, for example, for holography, velocimetry, inspection, chemical analysis etc.

The object of the present invention is to provide a wavelength independent interferometer.

The invention provides:

(a) means to receive electro-magnetic radiation, hereinafter called light, from a field of view;

(b) means to separate the light into two beams;

(c) means to combine the two beams; and (d) dispersive means interposed in the path of one of the two beams to produce a wavelength-dependent shear.

In one arrangement the dispersive means may be a transmission diffraction grating.

In a second arrangement the dispersive means may be a reflection grating.

Advantageously the separating means (b) and combining means (c) form a Mach-Zehnder interferometer. When the conventional Mach-Zehnder interferometer is illuminated with coherent light the separation of interference fringes produced in the interference plane is inversely proportional to the wavelength. The use of such an interferometer to detect coherent light of any wavelength will require a "broadband" detector able to detect a wide range of fringe separations. The present invention, however, enables use of a detector sensitised to a pre-determined fringe separation. Thus a moveable reticle may be placed in front of a detector to sensitise the detector to the fringe pattern.

Advantageously the dispersion means is such as to maximise the light in a single diffraction order so as to minimise the loss of optical energy.

The invention will now be described by way of example only with reference to the accompanying Drawings of which:

Figure 1:
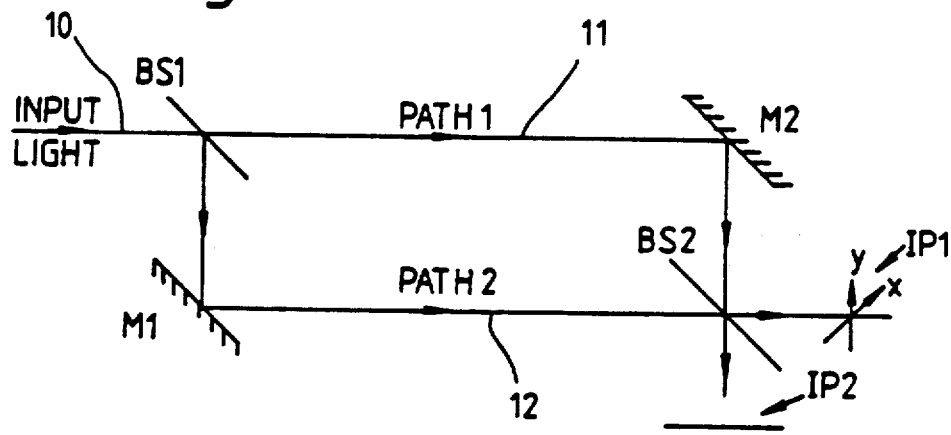
FIG. 1 illustrates a conventional Mach-Zehnder interferometer.

To-date, most of the temporal coherence processing has been based on two-beam interferometric arrangements, because such arrangements can most easily be modelled using the classical coherence theory. A typical (and useful) interferometer is the Mach-Zehnder shown in FIG. 1. The input light 10 is split into 2 paths 11, 12 at beamsplitter BS1 and is recombined at beamsplitter BS2. The beamsplitter BS2 forms 2 interference planes IP1 and IP2 which are in opposite phase.

The interferometer can be arranged (by adding components in one path or by tilting mirrors and beamsplitters) to produce different path lengths. If the optical length of path 1 is P1 and of path 2 is P2 then the path difference $\delta P$ is $$\delta P = P1 - P2 \tag{1}$$

For light of wavelength $\lambda$, the phase difference $\delta\phi$ between the two paths is given by $$\delta\phi = \frac{2\pi\delta P}{\lambda} \tag{2}$$

Referring to FIG. 1, interference Plane IP1 it can be seen that P (and hence from eqn (2) $\delta\phi$) is a function of position (x,y) in the plane.

Very often, a shear is introduced such that $$\delta P = Kx \tag{3}$$

where K is a constant given by the shear angle of (for example) mirrors M1 or M2.

The intensity profile of interference fringes from monochromatic light is given by:

$$I(x) = A[1 + \cos(\delta\phi)]$$

where A=constant and depends on source intensity, optics transmission and geometry.

From eqns (2) and (3) we get $$I(x) = A\left[1 + \cos\left(\frac{2\pi Kx}{\lambda}\right)\right] \tag{4}$$

Thus the spatial frequency of the interference pattern paration of fringes) is wavelength dependent, and the number of fringes M over a region $x_o$ is seen from eqns (2) and (3) to be given by $$M = \frac{\delta\phi}{2\pi} = \frac{\delta P}{\lambda} = \frac{Kx_o}{\lambda} \quad (5)$$

Figure 2:
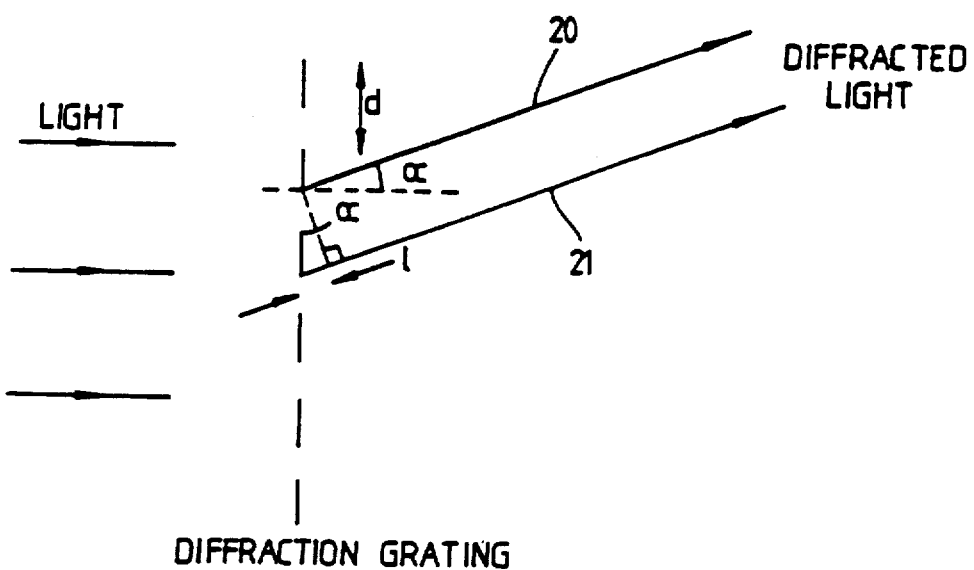
FIG. 2 illustrates the wavelength dependent shear introduced by a transmission diffraction grating.

The present invention uses a wavelength dependent shear to make the fringe separation wavelength independent. The invention is described by reference to a one-dimensional arrangement for clarity, although it can also be applied to more complex 2-dimensional configurations FIG. 2 shows how the wavelength dependent shear can be produced using a transmission diffraction grating of line separation d. The shear angle $\alpha$ can be seen to be given by $$\sin\alpha = \frac{L}{d} \quad (6)$$

where L is the path difference between adjacent beams 20 and 21.

The constructive interference criterion requires
ti $L = n\lambda$ where $\lambda$ is the wavelength of the light and n is an integer representing the diffraction order.

Hence from eqn (6)

$$\sin\alpha = \frac{n\lambda}{d} \quad (7)$$

Figure 3:
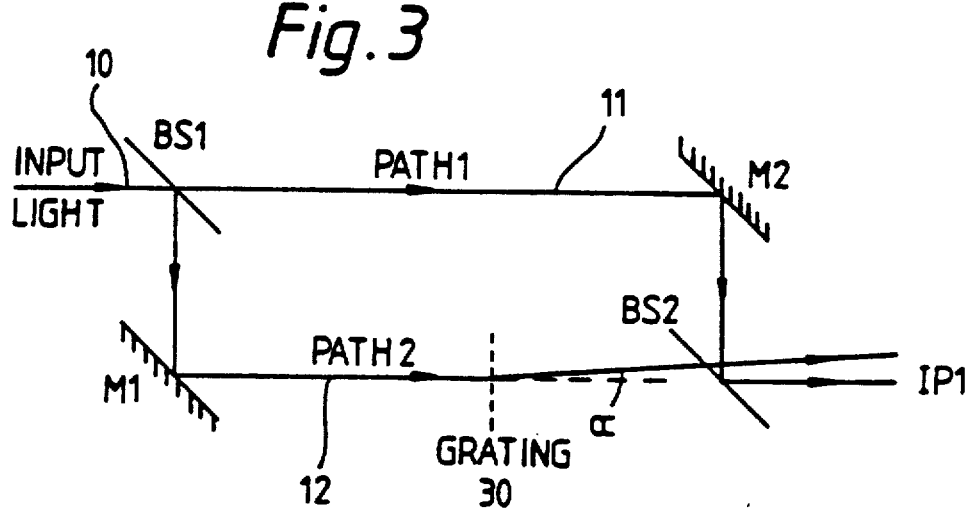
FIG. 3 illustrates a modified Mach-Zehnder interferometer according to the invention.

The simplest way to introduce the wavelength dependent shear into an interferometer is shown in FIG. 3; where for simplicity, only one interference plane IP1 of a modified Mach Zehnder interferometer is shown.

In this arrangement, however, a transmission diffraction grating 30 is provided ih the path 12 of one of the beams. This results in a shear angle $\alpha$ in this beam.

Figure 4:
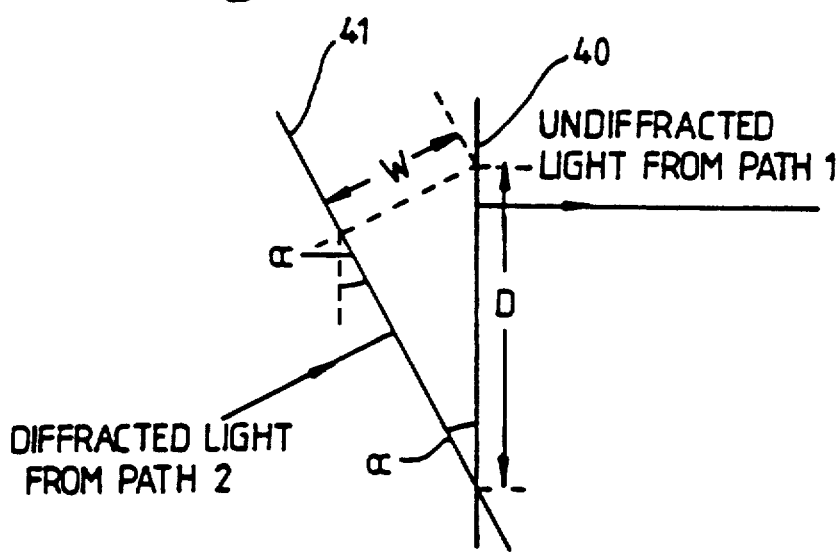
FIG. 4 illustrates the overlapping wavefronts at the interference plane shown in FIG. 3.

FIG. 4 shows how the wavefronts 40, 41 from paths 11 and 12 of FIG. 3 overlap at the interference plane. Note that for the sake of simplifying the explanation at this stage, only one diffracted order is shown. From FIG. 4, it can be seen that over a region length D, the maximum phase excursion $\phi m$ is given by $$\phi m = \frac{2\pi W}{\lambda} \quad (8)$$

Similarly, the number of fringes M over this region is $$M = \frac{\phi m}{2\pi} = \frac{W}{\lambda} \quad (9)$$

It can also be seen from the figure that $$W = D \sin\alpha \quad (10)$$

Combining eqns (9), (10) and (7) gives $$M = \frac{W}{\lambda} = \frac{D \sin\alpha}{\lambda} = \frac{D}{\lambda} \frac{n\lambda}{d} = \frac{nD}{d} \quad (11)$$

Hence the number of fringes per unit length is seen to be completely independent of wavelength.

Figure 5:
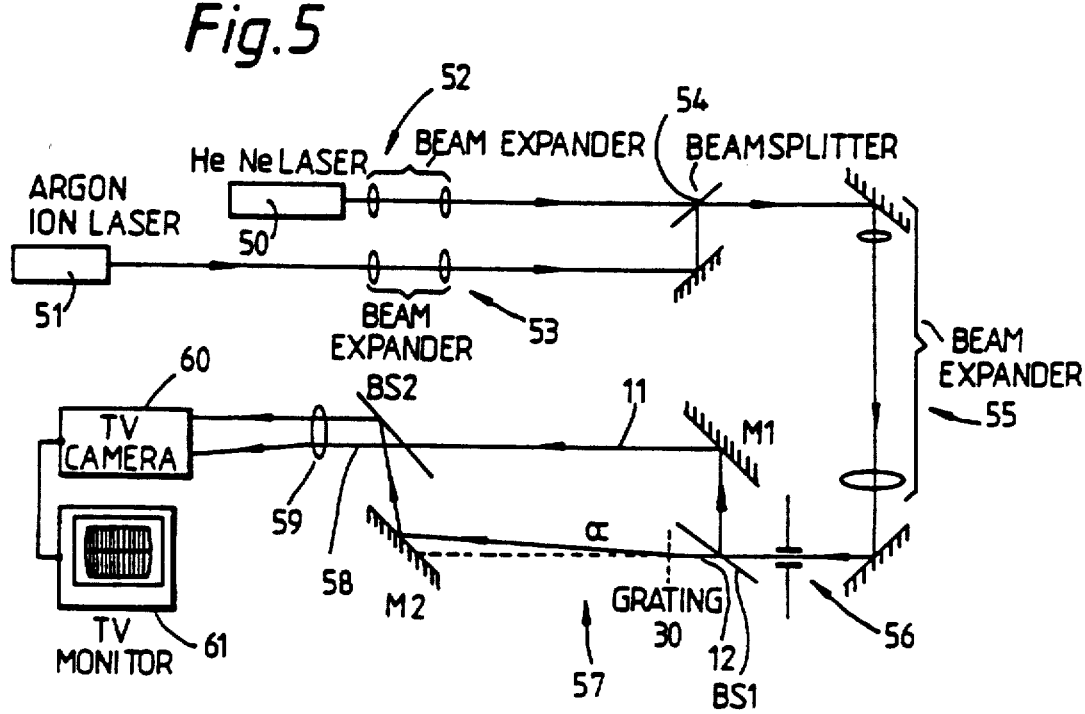
FIG. 5 illustrates an experimental arrangement for testing the invention.

A laboratory arrangement similar to that of FIG. 3 to verify the general principle of the invention is shown in FIG. 5. Two light sources were used, a Helium-Neon laser 50 (red light at 633 nm) and and Argon ion laser 51 emitting blue light (488 nm).

Figure 6:
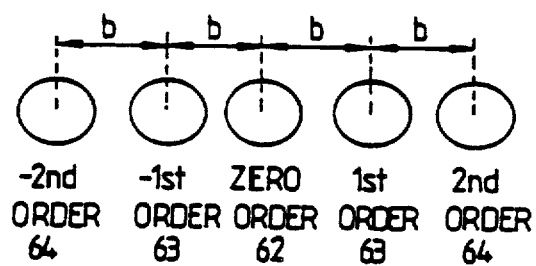
FIG. 6 illustrates the appearance of different diffraction orders in the interference plane.

The output of each laser was beam-expanded 52, 53 then combined by a beamsplitter 54. A further stage of expansion 55 ensured the beams would uniformly illuminate the whole circular input aperture 56 to the modified Mach Zehnder interferometer 57. The output 58 of the Mach Zehnder was expanded by a lens 59 to magnify the fringe structure which was observed using the TV camera 60 and monitor 61. FIG. 6 illustrates the appearance of the different diffraction orders 62-64 etc in the interference plane viewed by the TV camera 60.

The objective was to compare the fringe spacing for the red and blue light. From equation (5) it can be seen that for a non-wavelength compensated interferometer, the ratio of number of blue fringes ($M_b$) to red fringes ($M_r$) over a fixed length of the TV camera tube is simply $$\frac{M_b}{M_r} = \frac{\lambda_r}{\lambda_b}$$

where $\lambda_r$ and $\lambda_b$ are the wavelengths of the red and blue light respectively.

$$\frac{M_b}{M_r} = \frac{\lambda_r}{\lambda_b} = \frac{633}{488} = 1.30 \quad (12)$$

For the wavelength compensated arrangement shown in FIG. 5, the ratio $$\frac{M_b}{M_r} \text{ should be unity.}$$

During the experiment, the red and blue fringes had to be seen separately to avoid confusion when counting them. This was achieved by placing a blue spectral filter over the top of the TV tube and a red filter on the bottom. Hence the TV monitor display showed the two lots of fringes simultaneously.

The experimental procedure was first to set-up the interferometer without the grating to ensure correct alignment of all components.

At this stage, no interference fringes were observed since the light from both lasers was collimated with parallel wavefronts (ie no shear). The grating was then introduced such that a diffracted image similar to that shown in FIG. 6 was produced for each colourlight. The radius of the aperture stop 56 was reduced to ensure that diffracted orders did not overlap (hence avoiding interference between the orders); the brightest orders by far were the zero (62) and first (63) orders. The order separation b is a linear function of wavelength, hence the separation between zero and first order was greater for the red light. However, the red and blue first orders overlapped sufficiently for them both to be observed on the TV camera simultaneously.

During the experiment, the ratio $M_b/M_r$ was measured by eye on the TV monitor as $$\frac{M_b}{M_r} = \frac{20 \pm 1}{19 \pm 1} = 1.05 \pm 0.07 \quad (13)$$

It can be seen in eqn (13) that within the measurement accuracy, $M_b/M_r$ is unity, confirming the validity of the principle of the invention.

Figure 7:
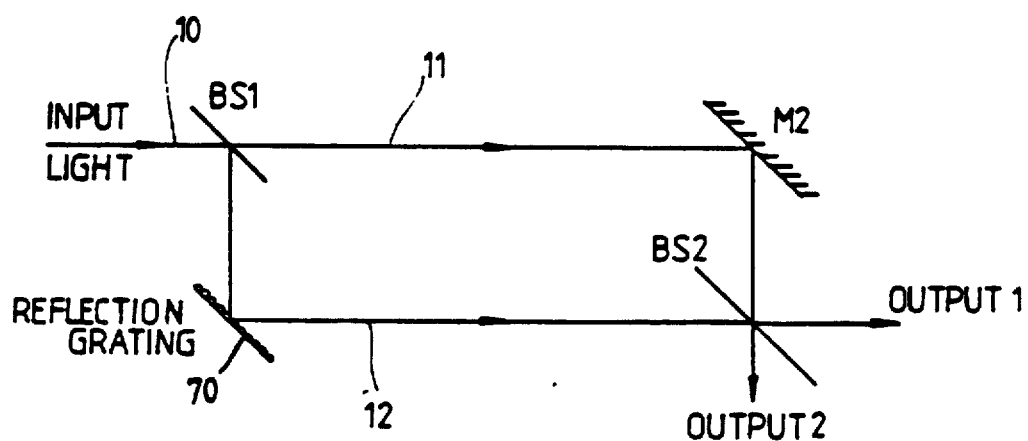
FIG. 7 shows an alternative interferometer including a reflection grating.

It is clearly desirable to diffract optical power efficiently into a single diffraction order. This can be achieved by using a holographic mirror 70 as shown in FIG. 7 instead of a diffraction grating with the following advantages:

(i) By combining the grating and mirror the number of components is reduced thereby facilitating a reduction in size and consequently increasing ruggedness.

(ii) The holographic approach can lead to efficient coupling of power into a single diffraction order.

To use light efficiently, another important consideration is the way in which the position of the diffracted beam changes at the interference plane with wavelength—with the configuration in FIG. 5, the light from the undiffracted path must illuminate all regions of the interference plane where diffracted light can appear.

Hence the undiffracted beam has to be overexpanded. Since the interference fringes are not localised to any particular region, transfer optics can be used to significantly reduce this effect.

Calculations currently being performed suggest that the constant fringe spacing can easily be maintained over a wide range of input angles (±30°), hence wide field of view operation is possible.

One advantage of the invention is that for a known spatial frequency of fringes (ie the spatial frequency narrowband case) simple fringe detection techniques can be used which use all the signal energy efficiently leading to a maximum signal to noise ratio. This should be compared with the prior art arrangements where fringe spacing is unknown and consequently the system is wide band and therefore it admits more noise.

Although described with reference to light, the invention may also be applied to rf techniques.

As indicated with reference to FIG. 1 there are two complementary interference planes IP1 and IP2 in the Mach Zehnder interferometer. Consequently when the invention is applied in this type of interferometer arrangement a second channel signal detection can be used to improve the processing power of the system.

I claim:

1. A wavelength-independent interferometer for optical signal processing comprising:
   (a) means to receive electro-magnetic radiation, hereinafter called light, from a field of view;
   (b) means to separate the light into two beams;
   (c) means to combine the two beams; and
   (d) diffraction means interposed in the path of only one of the two beams to produce a wavelength-dependent shear.

2. An interferometer as claimed in claim 1 wherein the diffraction means is a transmission diffraction grating.

3. An interferometer as claimed in claim 1 wherein the diffraction means is a reflection grating 4. An interferometer as claimed in claim 4 wherein the separating means (b) and combining means (c) form a Mach-Zehnder interferometer.

5. An interferometer as claimed in claim 4 wherein the detector is sensitised to a pre-determined fringe separation.

6. An interferometer as claimed in claim 5 wherein a moveable reticle is placed in front of a detector to sensitise the detector to the fringe pattern.

7. An interferometer as claimed in claim 6 wherein the diffraction means is such as to maximise the light in a single diffraction order so as to minimise the loss of optical energy.

* * * * *